US008322012B2

(12) United States Patent
Webb et al.

(10) Patent No.: US 8,322,012 B2
(45) Date of Patent: Dec. 4, 2012

(54) METHOD OF MANUFACTURING AN ENVIRONMENTALLY RESILIENT STRUCTURAL PANEL

(76) Inventors: Alan C. Webb, Columbus, GA (US); Stuart E. Webb, Phenix City, AL (US); Phillip D. Webb, Cataula, GA (US); Charles E. Webb, Phenix City, AL (US)

( * ) Notice: Subject to any disclaimer, the term of this patent is extended or adjusted under 35 U.S.C. 154(b) by 0 days.

(21) Appl. No.: 13/415,250

(22) Filed: Mar. 8, 2012

(65) Prior Publication Data

US 2012/0167650 A1    Jul. 5, 2012

Related U.S. Application Data

(60) Continuation of application No. 12/536,275, filed on Aug. 5, 2009, now Pat. No. 8,141,221, which is a division of application No. 11/035,548, filed on Jan. 13, 2005.

(51) Int. Cl.
*B21D 39/00* (2006.01)
*B32B 3/28* (2006.01)
*B32B 3/30* (2006.01)
*B32B 15/00* (2006.01)

(52) U.S. Cl. ............ 29/428; 428/163; 428/164; 428/167
(58) Field of Classification Search .................. 29/469.5; 428/163, 164, 167
See application file for complete search history.

(56) References Cited

U.S. PATENT DOCUMENTS

| | | |
|---|---|---|
| 1,616,968 A | 2/1927 | Hall |
| 2,003,752 A | 6/1935 | Landt |
| 2,271,310 A | 1/1942 | Schafer |
| 2,728,703 A | 12/1955 | Kiernan et al. |
| 2,851,372 A | 9/1958 | Kaplan et al. |
| 2,877,151 A | 3/1959 | Doherty et al. |
| 3,401,493 A | 9/1968 | Lindner |
| 3,630,802 A | 12/1971 | Dettling |
| 3,660,200 A | 5/1972 | Anderson et al. |
| 3,733,606 A | 5/1973 | Johansson |
| 3,960,639 A | 6/1976 | Kudo |
| 3,981,762 A | 9/1976 | Davis et al. |
| 4,034,375 A | 7/1977 | Wallin |
| 4,269,055 A | 5/1981 | Sivachenko et al. |
| 4,284,444 A | 8/1981 | Bernstein et al. |
| 4,409,275 A | 10/1983 | Samowich |
| 4,479,994 A | 10/1984 | Berg |
| 4,493,863 A | 1/1985 | Karlsson |
| 4,529,633 A | 7/1985 | Karlsson |

(Continued)

FOREIGN PATENT DOCUMENTS

DE    19705510 A1    8/1998

OTHER PUBLICATIONS

"Nickeloid Seventy-Five, 1898-1973," published by American Nickeloid Company as 75th Anniversary booklet in 1973, 3 pages.

(Continued)

*Primary Examiner* — Jermie Cozart
(74) *Attorney, Agent, or Firm* — McClure, Qualey & Rodack, LLP

(57) ABSTRACT

An environmentally resilient building product of a vinyl laminated formed-sheet metallic substrate wherein the vinyl laminate is adhesively attached to the formed-sheet metallic substrate to provide a durable and attractive surface. Possible decorative and resilient surfaces include, but are not limited to solid colors, metallic finishes, and graphical images or patterns, all available in a variety of textures.

7 Claims, 7 Drawing Sheets

U.S. PATENT DOCUMENTS

| | | |
|---|---|---|
| 4,606,966 A | 8/1986 | Karlsson |
| 4,767,649 A | 8/1988 | Birch |
| 4,791,023 A | 12/1988 | Suzuki et al. |
| 4,879,171 A | 11/1989 | Jeffrey |
| 4,940,619 A | 7/1990 | Smith, Jr. et al. |
| 4,983,436 A | 1/1991 | Bailey et al. |
| 5,030,504 A | 7/1991 | Botsolas et al. |
| 5,080,165 A | 1/1992 | Engelhardt |
| 5,111,572 A | 5/1992 | Haiml et al. |
| 5,132,164 A | 7/1992 | Moriya et al. |
| 5,205,091 A | 4/1993 | Brown |
| 5,288,356 A | 2/1994 | Benefiel |
| 5,312,678 A | 5/1994 | McCullough, Jr. et al. |
| 5,565,260 A | 10/1996 | Hawk |
| 5,670,261 A | 9/1997 | Kameya et al. |
| 5,953,810 A | 9/1999 | Goodhart et al. |
| 6,153,309 A | 11/2000 | Razavi |
| 6,156,434 A | 12/2000 | Hayashi et al. |
| 6,364,992 B1 | 4/2002 | Nambu et al. |
| 6,605,340 B1 | 8/2003 | Heiniger |
| 2001/0005965 A1 | 7/2001 | Beck |
| 2001/0047634 A1 | 12/2001 | Wick |
| 2002/0114924 A1 | 8/2002 | Albert |
| 2003/0037499 A1 | 2/2003 | Coulton |
| 2003/0152766 A1 | 8/2003 | Vargo et al. |
| 2004/0174046 A1 | 9/2004 | Kamura et al. |
| 2005/0003154 A1 | 1/2005 | White |

OTHER PUBLICATIONS

Advertisement: "Design with the Rich Warmth of Wood Without ever Touching a Tree," by American Nickeloid Company, Appliance, Oct. 1992, 2 pages.

Web site pages www.cladrex.com, "Clad Rex We Start with your finish," 2 pages, copyrighted by Clad-Rex, Inc., 2004.

Web site pages www.cladrex.com/designer_coated_metals, "Clad Rex We start with your finish," 2 pages, copyrighted by Clad-Rex, Inc., 2004.

METHOD OF MANUFACTURING AN ENVIRONMENTALLY RESILIENT STRUCTURAL PANEL

CROSS-REFERENCE TO RELATED APPLICATION

This application is a continuation of U.S. utility application entitled, "Method of Manufacturing an Environmentally Resilient Structural Panel," having Ser. No. 12/536,275, now U.S. Pat. No. 8,141,221 B2 filed Aug. 5, 2009, which is a divisional application of U.S. utility application entitled, "Environmentally Resilient Corrugated Building Products and Methods of Manufacture," having Ser. No. 11/035,548, filed Jan. 13, 2005, which is allowed, and which are entirely incorporated herein by reference.

TECHNICAL FIELD

The present disclosure is generally related to building products and, more particularly, is related to products and manufacturing methods for environmentally resilient building products.

BACKGROUND

Many different products have utilized, and continue to utilize, sheet metal as a raw material for constructing various components. Sheet metal generally possesses a high tensile strength, but is often very flexible. For structural purposes, the flexibility can be reduced through the use of additional structure attached to the sheet metal, such as beams, purlins, bars, and posts, among others. Additional structural components, however, increase the cost for the additional materials and increase the size and weight of the assembled component.

One method for avoiding the requirement for additional structure is to break or bend the sheet along a line where the reduction in flexibility is desired. When done as a series of parallel bends to form channels or ridges, this is known as corrugating. Corrugating is known to produce metal sheet products with significantly reduced flexibility along at least one axis. Although the corrugation may be produced by performing a series of independent breaks on a metal sheet, corrugating machines also referred to as roll forming machines have been developed to provide corrugation to flat sheet metal in a continuous process. An example of the prior art relating to roll forming machines can be found in U.S. Pat. No. 4,269,055, which is hereby incorporated by reference in its entirety.

Metal sheets are often used in applications where specific aesthetic properties are desirable on at least one surface of the metal sheet. In some cases, the aesthetic property may constitute a specific color. Methods for applying a solid color to corrugated metallic products have previously been performed using spraying or coating processes 100, as illustrated in FIG. 1. Referring to FIG. 1, the flat metallic product 110 is unrolled from a coil 102 and made proximate to, for example, spray nozzles 120, which deliver a sprayed paint or coating 130 to the surface of the flat metallic product 110. After coating or painting, the flat metallic product is dried or cured using, for example, a heater or oven 140 and then rolled into a coil 104. Other cases may require specific graphical images or patterns in lieu of a solid color. Some methods of applying a graphical image or pattern to flat metallic product include immersion graphics methods where, for example, an inked film is applied to the flat metallic product, which is then immersed to dissolve the film, leaving the ink image or pattern on the flat metallic product. Like the painted coating products discussed above, the immersion graphics products may not provide a surface that is sufficiently resistant to scratching, abrasion, weathering, or fading due to outdoor exposure or mechanical impact associated with subsequent processing, assembly, or use.

One technique for providing mechanically resilient protection for metallic sheet products includes laminating. The laminating process 200 in this context, as illustrated in FIG. 2, includes adhesively bonding a graphic film 202 to at least one surface of a flat metallic sheet 201. By way of example, the graphic film 202 may be applied using the pressure of a laminating roll 220. Additionally, the laminating roll 220 may possess specific surface properties which are transferred or embossed into the surface of the graphic film 202 during application. The resulting laminated metallic sheet 210 includes a graphic film 202, which may possess specific aesthetic properties including solid colors, metallic finishes, patterns, and graphical images. Additionally, if embossing was performed, the graphic film 202 may possess specific surface finish properties such as brushed, matte, or pebbled, among others. This process, however, has only been applicable to flat products because the manufacturing impracticality of continuously processing laminated corrugated products. For example, previous attempts to corrugate a laminated sheet have resulted in a graphic film that weakens and cracks during subsequent processing and is not resistant to damaging elements associated with an outdoor environment.

Thus, a heretofore-unaddressed need exists in the industry to address the aforementioned deficiencies and inadequacies.

SUMMARY

Embodiments of the present disclosure provide an environmentally resilient structural product, comprising: a vinyl laminate and a formed-sheet metallic substrate having a first side; wherein the vinyl laminate is adhesively attached to the first side.

Briefly described, other embodiments of the present disclosure provide an environmentally resilient outdoor building, comprising: at least one formed-sheet metallic panel, the panel comprising a vinyl layer, and a corrugated metallic substrate having a first side, wherein the vinyl layer is bonded to the first side.

Embodiments of the present disclosure can also be viewed as methods for providing a decorative, environmentally resilient, structurally significant panel. In this regard, one embodiment of such a method, among others, can be broadly summarized by the following steps: bonding a first side of a vinyl layer to a first side of a flat metallic sheet; and deforming the flat metallic sheet to create a plurality of parallel ribs in the first side of the metallic sheet.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
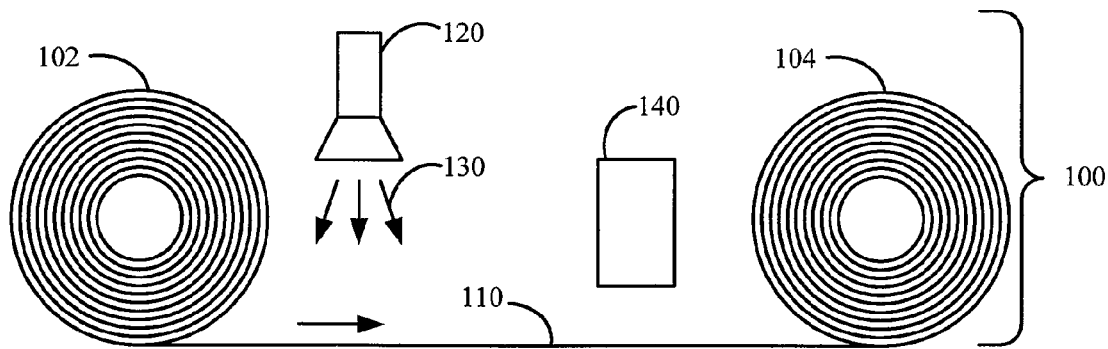
FIG. 1 is a side view of a coating/painting process for metal products as is known in the prior art.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Figure 2:
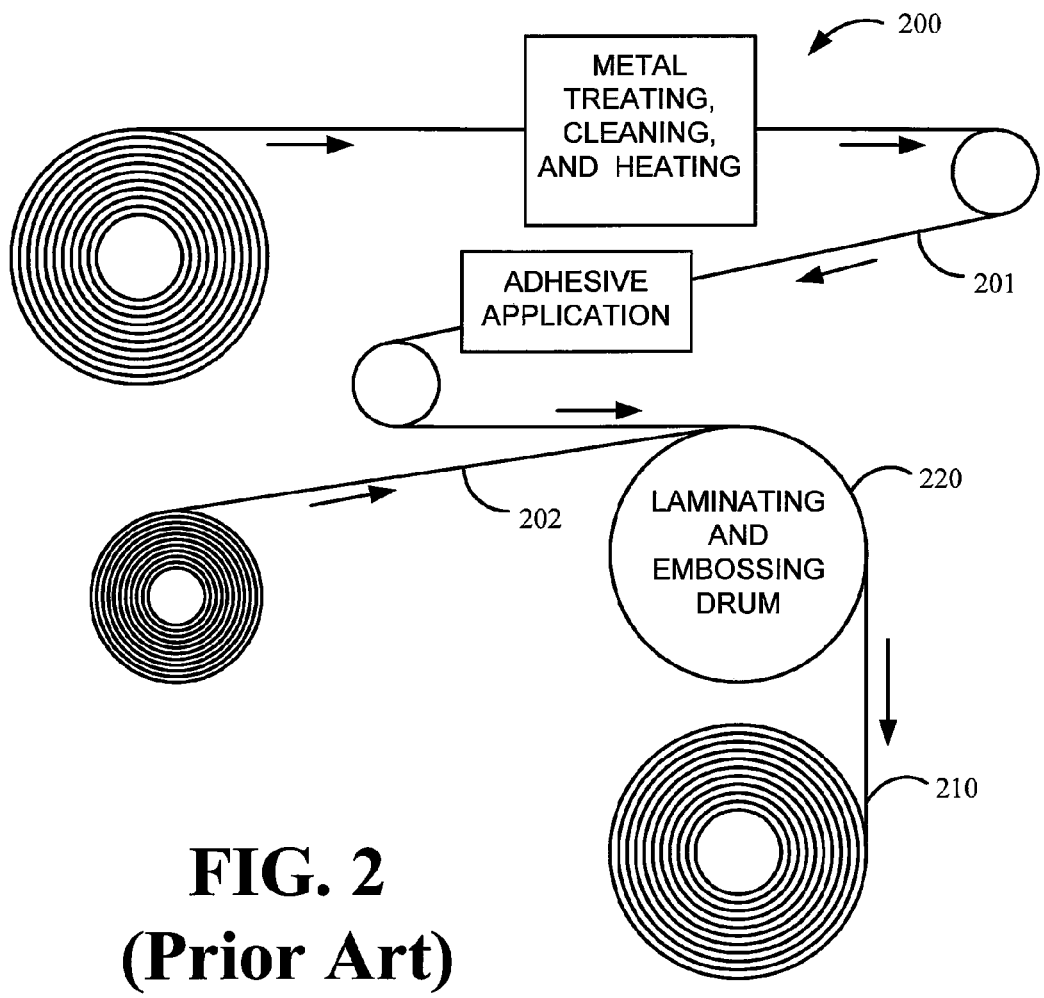
FIG. 2 is a side view of a process of applying a laminate to flat metallic sheet as is known in the prior art.
Figure 3:
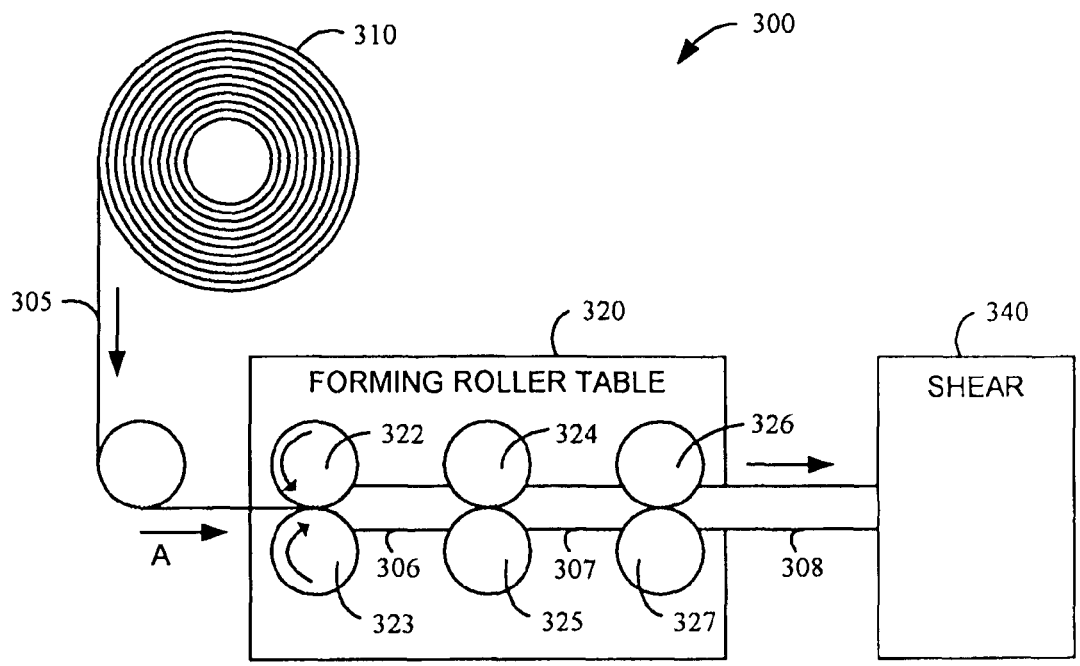
FIG. 3 is an illustration of a side-elevational view of an exemplary roll former used in an embodiment, as disclosed herein.

Reference is made to FIG. 3, which illustrates a side-elevational view of an exemplary roll former used in an embodiment, as disclosed herein. The roll former 300 begins with a vinyl laminated flat metallic sheet 305, as manufactured in a device consistent with the prior art, as discussed in reference to FIG. 2 addressed in the preceding Background section. The vinyl laminated flat metallic sheet 305 of FIG. 3 retains a carrier film (not shown) associated with the vinyl laminating material. The vinyl laminated flat metallic sheet 305 is propelled in direction A and drawn between a first set of complementary forming rollers 322 and 323 to form a first set of channels/ridges, creating a partially formed sheet 306. The partially formed sheet 306 is propelled from the first set of complementary forming rollers 322 and 323 and drawn between a second set of complementary rollers 324 and 325. The second complementary forming rollers 324 and 325 form additional channels/ridges to create partially formed sheet 307. Similarly, the partially formed sheet 307 proceeds through complementary forming rollers 326 and 327 to form a final set of channels/ridges such that the corrugated sheet 308 is created. The corrugated vinyl laminated metallic sheet 308 is then fed into a shear 340, where the continuous sheet is cut into panels for subsequent packaging or manufacturing (not shown).

Figure 4:
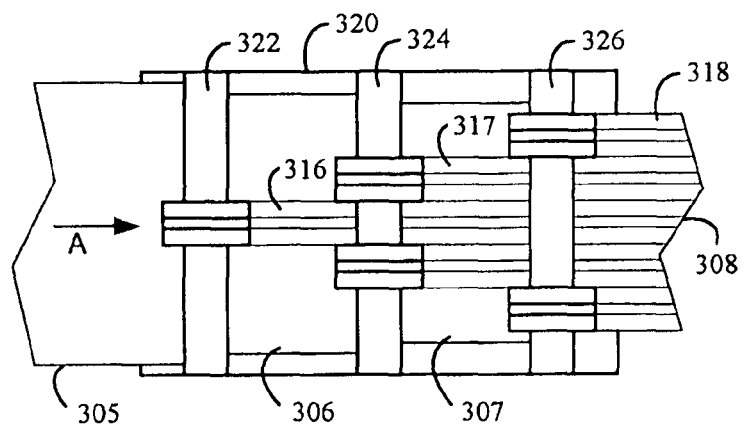
FIG. 4 is an illustration of a partial top view of the exemplary roll former of FIG. 3 used in an embodiment, as disclosed herein.

Reference is now made to FIG. 4, which illustrates a partial top view of the exemplary forming roller table of FIG. 3, as discussed above. The vinyl laminated flat metallic sheet 305 is propelled in a direction A between a first top forming roller 322 and a first bottom forming roller, which is not visible in this view. The partially formed sheet 306 produced by the first complementary forming rollers 322 and 323 (see FIG. 3) has channels/ridges 316 corresponding to the profile of the gap between the first forming rollers 322 and 323 (see FIG. 3). The partially formed sheet 306 is then drawn into the gap between a second top forming roller 324 and a second bottom forming roller, which is not visible in this view. The partially formed sheet 307 produced by the first and second complementary forming rollers 322, 323 (see FIG. 3), 324, and 325 (see FIG. 3) has channels/ridges 317 corresponding to the cumulative profile of the gaps between the two sets of complementary forming rollers 322, 323, 324, and 325.

The partially formed sheet 307 is similarly drawn between a third top forming roller 326 and a complementary third bottom forming roller, which is not visible in this view. A final set of channels/ridges 318 is formed resulting in a corrugated vinyl laminated metallic sheet 308. Note that as the vinyl laminated metallic sheet progresses through each of the sets of complementary forming rollers, the width of the sheet is reduced by the portion of the sheet profile which is deformed to create the depth and height of the channels/ridges, respectively. In other words, the final corrugated vinyl laminated metallic sheet 308 is not as wide as the vinyl laminated flat metallic sheet 305 that entered the forming roller table 320. One of ordinary skill in the art knows, or will know, that the complementary forming roller configurations of FIGS. 3 and 4 are merely exemplary and that a roll former 300 configured with any number, combination, or configuration of forming rollers is consistent with this disclosure. For example, an alternative roll former 300 may have four or more complementary sets of forming rollers, each configured to produce a single channel or ridge in a vinyl laminated metallic sheet.

Figure 5:
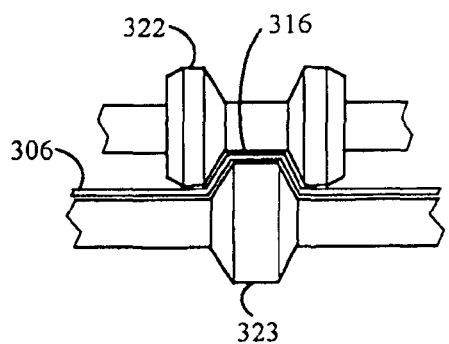
FIG. 5 is an illustration of a partial end view of a set of complementary rollers and a partial cross-sectional view of a vinyl laminated metallic sheet of the exemplary roll former of FIG. 3 used in an embodiment, as disclosed herein.

Reference is briefly made to FIG. 5, which is an illustration of a partial end view of a set of complementary rollers with a partial cross-sectional view of a vinyl laminated metallic sheet. As discussed above, the top forming roller 322 has a complementary profile with the bottom-forming roller 323. As the vinyl laminated metallic sheet 306 is drawn through the gap between the two forming rollers 322 and 323, the channel/ridge 316 is formed. One of ordinary skill in the art knows or will know that the multiple channels/ridges 316 may be formed by multiple serially arranged forming roller sets configured at specific widths across the vinyl laminated metallic sheet and that the multiple channels/ridges may aggregate to form a corrugated sheet. Further, one of ordinary skill in the art will appreciate that the channels/ridges may have different depths, widths, and shape profiles.

Further, one of ordinary skill in the art will appreciate that a roll former is but one way to produce formed-sheet products. For example, in addition to roll forming, sheets can be formed using bends, breaks, or folds for introducing the additional dimensional characteristics associated with formed-sheet products. Additionally, one of ordinary skill in the art knows or will know that a formed-sheet product includes any sheet product subsequently processed to introduced additional dimensional characteristics including products with any number, configuration, or combination of bends, breaks, folds, curls, or rolls.

Figure 6:
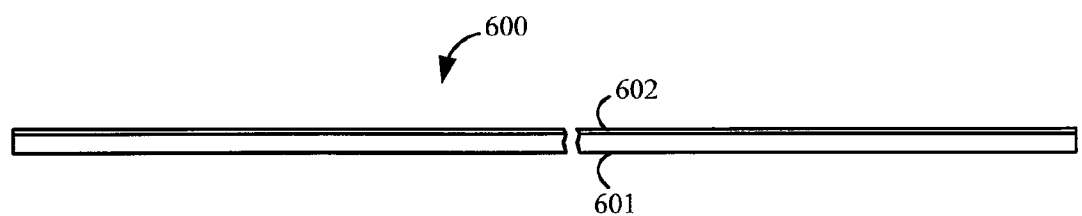
FIG. 6 is a side cross-sectional view of a flat metallic sheet with a vinyl laminate.
Figure 7:
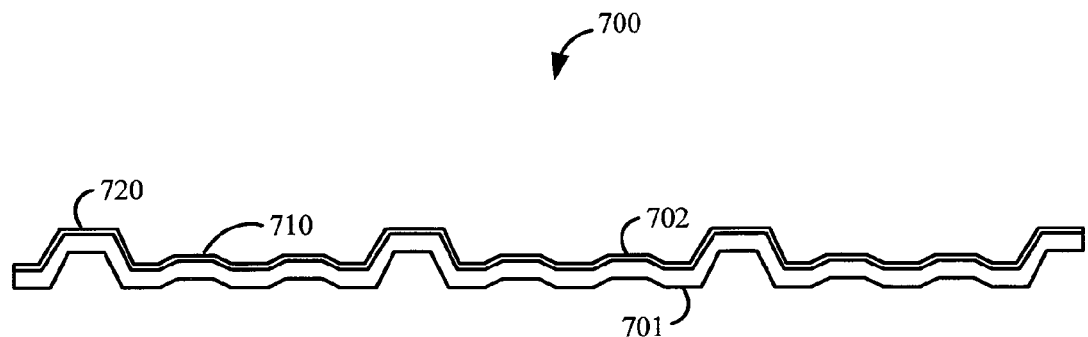
FIG. 7 is an end cross-sectional view of a vinyl-laminated corrugated metal sheet, as disclosed herein.

Reference is now made to FIGS. 6 and 7, which illustrate cross-sectional end views of a vinyl laminated flat metallic sheet and a vinyl-laminated corrugated metal sheet, respectively. The vinyl laminated flat metallic sheet 600 is formed by a laminating process, such as the process disclosed in the above discussion of FIG. 2, and includes a vinyl laminate 602, which has a thickness of at least 0.0005 inches, bonded to at least one side of the flat metallic sheet 601, which has an exemplary thickness ranging from 10 gauge to 35 gauge. The corrugated vinyl laminated metallic sheet 700 of FIG. 7 includes the corrugated metallic substrate 701 and a vinyl layer 702 bonded to at least one side of the corrugated metallic substrate 701. Additionally, the corrugated vinyl laminated metallic sheet 700 includes multiple parallel channels 710 and ridges 720.

The metallic sheets or substrates as disclosed herein may be steel, aluminum, tin, copper, or brass, among others.

The bonding of the vinyl layer 602 to the metallic sheet 601 is performed on a flat metallic sheet, as previously discussed in reference to FIG. 2. The vinyl laminated flat metallic sheet may be processed using the methods herein to produce the corrugated vinyl laminated metallic sheet. Although the corrugated profile of the product 700 is illustrated as including three primary ribs 720 per section with two secondary ribs 710 between each of the primary ribs 720, one of ordinary skill in the art knows or will know that the methods herein may be utilized to produce numerous combinations of ribs having various and varied geometric profiles and dimensional characteristics. The product 700 also includes a vinyl layer 702 bonded to one side of the metallic sheet 701. The vinyl layer 702, which has a thickness of at least 0.0005 inches, is UV-stabilized and provides an ultra-violet light resistant protective covering for the metallic sheet 701. Additionally, the product 700 provides a vinyl layer 702 that is resistant to delamination. The vinyl layer 702 also provides a decorative finish for the product 700. For example, the vinyl layer 702 may have solid color or some graphical representation. Exemplary graphical representations include, but are not limited to, metallic finishes such as gold or silver including different textures such as brushed, matte, pebbled, or gloss, among others. Other exemplary graphical representations include, but are not limited to, natural finishes such as wood grain or an outdoor environment blending pattern such as, for example, one sold under the registered trademark, REALTREE®.

Figure 8:
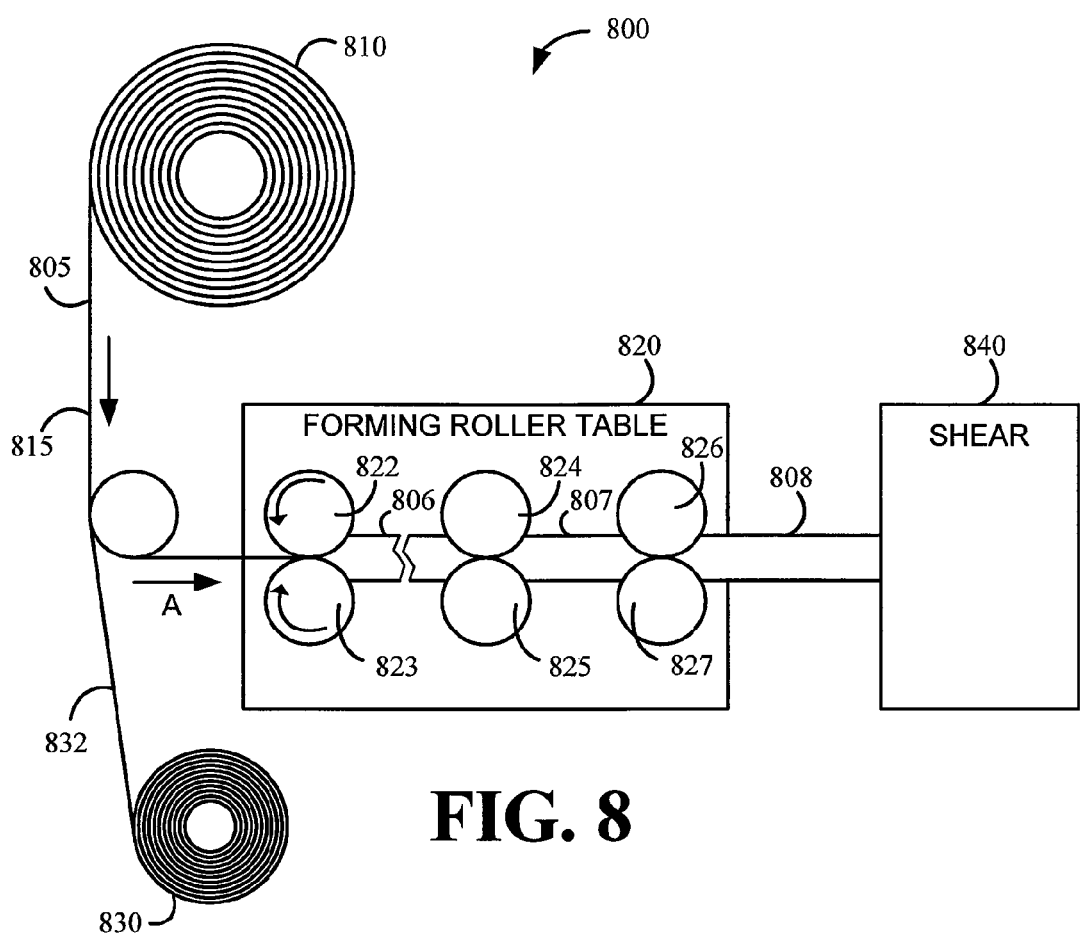
FIG. 8 is an illustration of side-elevational view of an exemplary roll former used in an embodiment, as disclosed herein.

Reference is now made to FIG. 8, which illustrates a side-elevational view of an exemplary roll former used in an embodiment, as disclosed herein. The roll former 800 begins with a vinyl laminated flat metallic sheet 805, as manufactured in a device consistent with the prior art, as previously discussed in reference to FIG. 2. The vinyl layer 815 of the vinyl laminated flat metallic sheet 805 includes a carrier film 832, that may be removed from the vinyl laminated flat metallic sheet 805 or it may be left in place during the forming operation. If the carrier film 832 is removed before the vinyl laminated flat metallic sheet 805 enters the forming roller table 820, the carrier film is wound onto a separate roll 830. Although, as illustrated, only one side of the vinyl laminated flat metallic sheet is shown as having a vinyl laminate, one of ordinary skill in the art will appreciate that both sides of the vinyl laminated flat metallic sheet may have a vinyl laminate applied. In an embodiment having two sides of vinyl laminate, the removal of a second carrier film may be performed prior to the roll forming process or the second carrier film may remain attached during subsequent processing.

After removing the carrier film 832, the vinyl laminated flat metallic sheet 806 is drawn between a first set of complementary forming rollers 822 and 823 to form a first set of channels/ridges, creating a partially formed sheet 806. The partially formed sheet 806 is propelled from the first set of complementary forming rollers 822 and 823 and drawn between a second set of complementary rollers 824 and 825. The second set of complementary forming rollers 824 and 825 forms additional channels/ridges to create partially formed sheet 807. Similarly, the partially formed sheet 807 proceeds through complementary forming rollers 826 and 827 to form another set of ridges/channels such that the corrugated sheet 808 is produced without the carrier film 832. One of ordinary skill in the art knows or will know that the roll forming process may be performed by four or more sets of forming rollers, each configured to generate an element of the overall profile. The corrugated vinyl laminated metallic sheet 808 may then be fed into a shear 840, where the continuous sheet is cut into panels for subsequent packaging or manufacturing (not shown). Additionally, excess vinyl laminate may be trimmed at one or more of numerous different stages of the manufacturing. For example, the vinyl laminate may be trimmed before or after the roll forming 820 or before, after, or during the shear function 840.

Figure 9A:
FIGS. 9A-9D are end cross-sectional views of exemplary formed-sheet vinyl laminated metallic products, as disclosed herein.
Figure 9B:
Figure 9C:
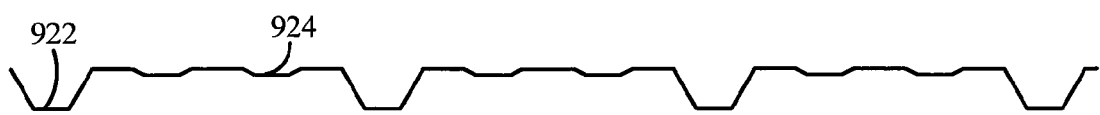
Figure 9D:

Reference is now made to FIGS. 9A-9D, which illustrate end cross-sectional views of exemplary formed-sheet vinyl laminated metallic products, as disclosed herein. The exemplary profile of FIG. 9A includes five primary ribs 902, each separated by two wide, shallow ribs 904. The exemplary profile of FIG. 19B similarly includes four primary ribs 912, each separated by two wide, shallow ribs 914. As is shown, the primary ribs 912 of FIG. 9B illustrate a different geometrical and dimensional profile than the primary ribs 902 of FIG. 9A. The exemplary profile of FIG. 9C similarly includes four primary channels 922, each separated by two wide, shallow channels 924. The exemplary profile illustrated in FIG. 9D includes four wide, shallow channels 932, one standing seam locking surface 934, and one standing seam locking tab 936.

Figure 10:
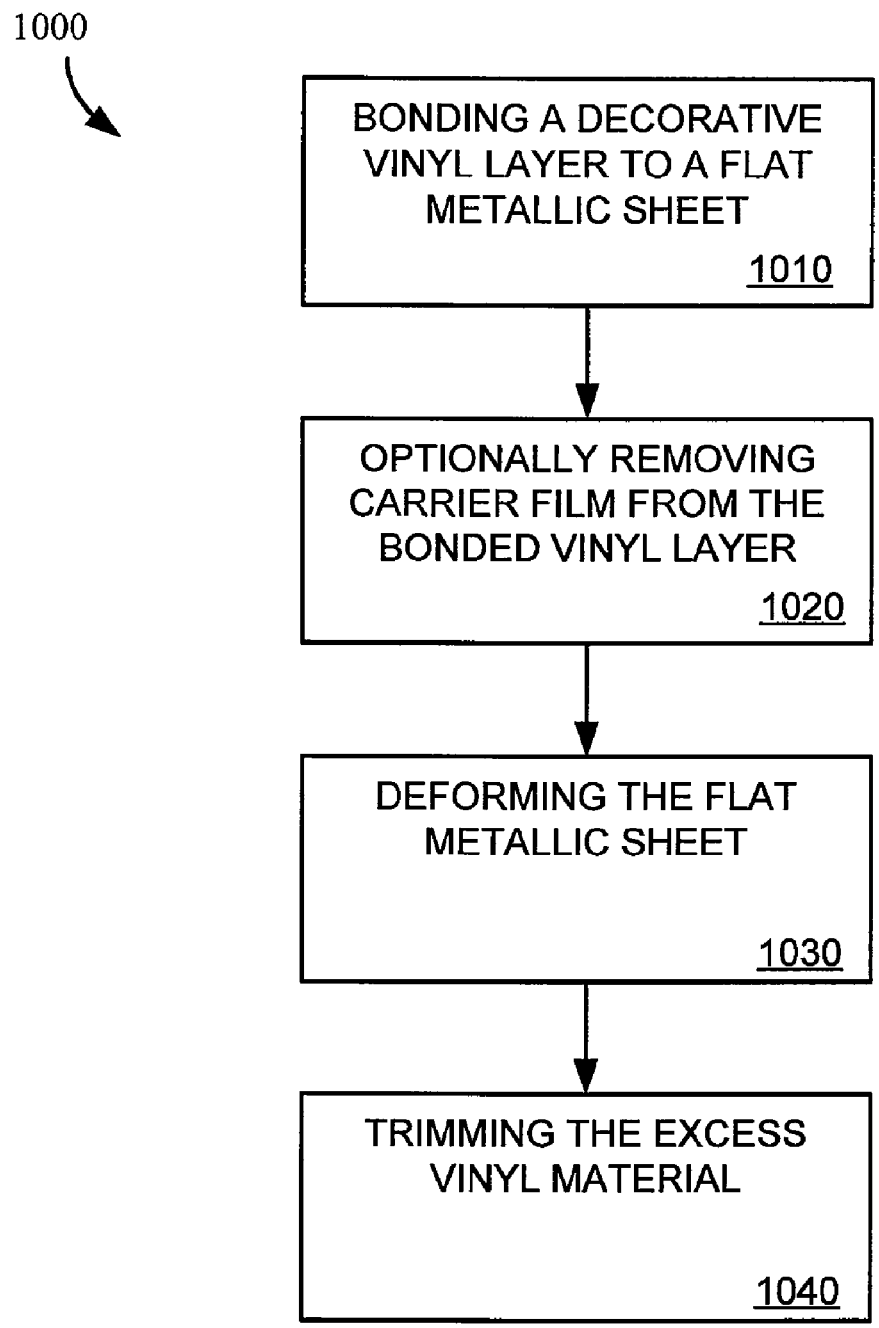
FIG. 10 is a block diagram of an exemplary method of producing environmentally resilient products as disclosed herein.

Reference is now made to FIG. 10, which is a block diagram of an exemplary method of producing environmentally resilient products, as disclosed herein. The method 1000 first bonds a vinyl layer to a flat metallic sheet in step 1010. Next, optional step 1020 constitutes removing the carrier film component of the vinyl layer. The vinyl laminated flat metallic sheet is deformed using, for example, a roll forming device, to produce channels/ridges in block 1030. In block 1040 the excess vinyl material is trimmed from the edges of the metallic sheet, if present. This step may be optionally performed before or after the deforming step.

Figure 11:
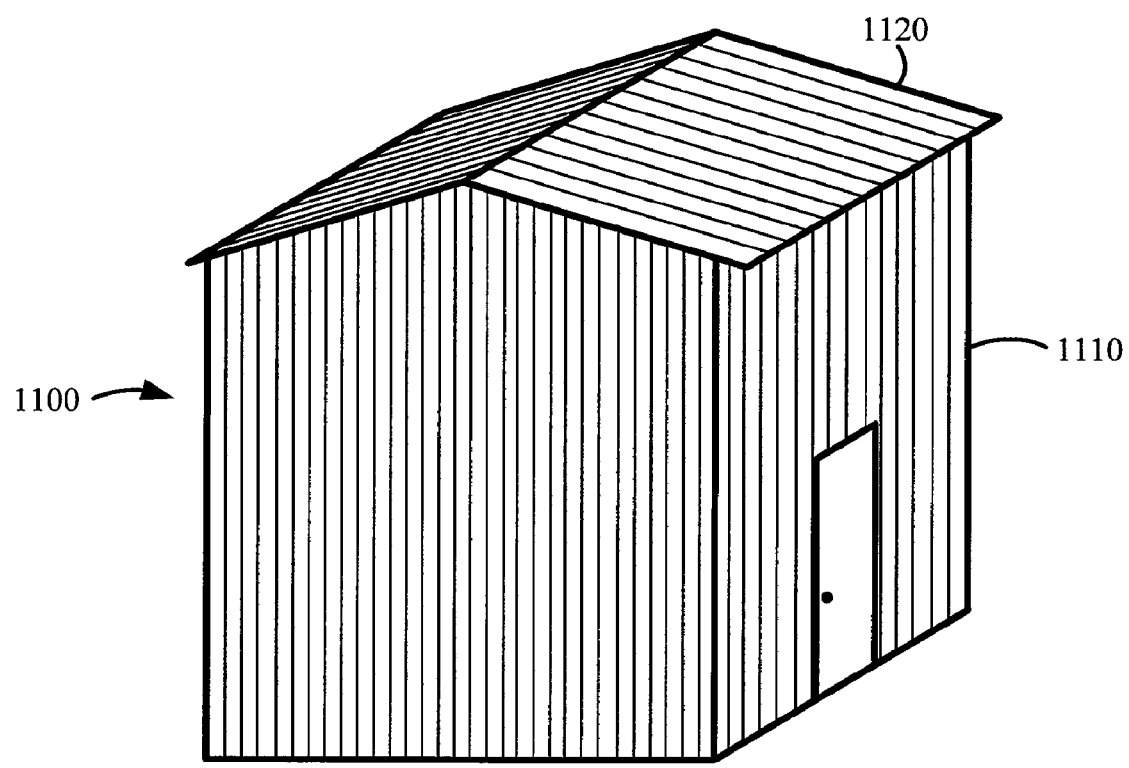
FIG. 11 is a perspective view of an exemplary building constructed using environmentally resilient corrugated metallic products, as disclosed herein.

Reference is now made to FIG. 11, which illustrates a perspective view of an exemplary building constructed using environmentally resilient corrugated products, as disclosed herein. The building 1100 may be fully or partially constructed utilizing corrugated vinyl laminated metallic wall panels 1110 consistent with the disclosure herein. Corrugated vinyl laminated metallic wall panels 1110 may be produced from metallic substrate in the exemplary thickness range from 18 gauge to 30 gauge. As discussed above, the vinyl laminated panels are environmentally resilient. Additionally, or in the alternative, the building 1100 may also utilize one or more corrugated vinyl laminated metallic roof panels 1120 for all or part of the roof. Corrugated vinyl laminated metallic roof panels 1120 may be produced from metallic substrate in the exemplary thickness range from 18 gauge to 30 gauge.

It should be emphasized that the above-described embodiments of the present disclosure, particularly, any illustrated embodiments, are merely possible examples of implementations, merely to provide a clear understanding of the principles of the disclosure. Many variations and modifications may be made to the above-described embodiment(s) of the disclosure without departing substantially from the spirit and principles of the disclosure. All such modifications and varia- At least the following is claimed:

1. A method for providing a decorative, environmentally resilient, structurally significant panel, comprising the steps of:
   providing a coiled flat, metallic sheet;
   unrolling the coiled metallic sheet;
   permanently bonding a first side of a vinyl laminate sheet material having a thickness of at least 0.0005 inches to a first side of the uncoiled flat metallic sheet being coated wherein a second side of the metallic sheet is uncoated;
   deforming the flat metallic sheet, with the vinyl laminate sheet material bonded thereto, to create a deformation in the metallic sheet and in the vinyl laminate sheet material; and
   cutting the sheet into panels in order to form a building panel.

2. The method of claim 1, wherein the second side of the vinyl laminate sheet material comprises a graphical appearance.

3. The method of claim 2, wherein the graphical appearance is an outdoor environment blending pattern.

4. The method of claim 2, wherein the graphical appearance is selected from the group of: wood grain; metallic; solid color, and an outdoor environment blending pattern.

5. The method of claim 1, wherein the vinyl laminate sheet material exhibits an ultra-violet light degradation resistance.

6. The method of claim 1, wherein the flat metallic sheet comprises steel having a thickness between 10 gauge and 35 gauge, inclusively.

7. The method of claim 1, wherein the panel exhibits material stresses associated with forming the plurality of parallel ribs after bonding the vinyl laminate sheet material to the panel.

* * * * *